(12) United States Patent
Takada

(10) Patent No.: US 11,500,632 B2
(45) Date of Patent: Nov. 15, 2022

(54) PROCESSOR DEVICE FOR EXECUTING SIMD INSTRUCTIONS

(71) Applicant: ArchiTek Corporation, Osaka (JP)

(72) Inventor: Shuichi Takada, Osaka (JP)

(73) Assignee: ArchiTek Corporation, Osaka (JP)

( * ) Notice: Subject to any disclaimer, the term of this patent is extended or adjusted under 35 U.S.C. 154(b) by 0 days.

(21) Appl. No.: 17/049,197

(22) PCT Filed: Apr. 23, 2019

(86) PCT No.: PCT/JP2019/017233
§ 371 (c)(1),
(2) Date: Oct. 20, 2020

(87) PCT Pub. No.: WO2019/208566
PCT Pub. Date: Oct. 31, 2019

(65) Prior Publication Data
US 2021/0240473 A1    Aug. 5, 2021

(30) Foreign Application Priority Data

Apr. 24, 2018  (JP) .............................. JP2018-082939

(51) Int. Cl.
*G06F 9/30* (2018.01)
*G06F 9/38* (2018.01)
(Continued)

(52) U.S. Cl.
CPC ........ *G06F 9/30043* (2013.01); *G06F 9/3012* (2013.01); *G06F 9/3013* (2013.01);
(Continued)

(58) Field of Classification Search
CPC .................................................. G06F 9/30043
See application file for complete search history.

(56) References Cited

U.S. PATENT DOCUMENTS

| | | |
|---|---|---|
| 2002/0184471 A1 | 12/2002 | Hatae et al. |
| 2011/0173416 A1 | 7/2011 | Noda et al. |

(Continued)

FOREIGN PATENT DOCUMENTS

| | | |
|---|---|---|
| JP | H11-312085 A | 11/1999 |
| JP | 2002-358288 A | 12/2002 |

(Continued)

OTHER PUBLICATIONS

International Search Report issued in PCT/JP2019/017233; dated Aug. 6, 2019.

(Continued)

*Primary Examiner* — Michael J Metzger
(74) *Attorney, Agent, or Firm* — Studebaker & Brackett PC

(57) ABSTRACT

In a processor device according to the present invention, a memory access unit reads data to be processed from an external memory and writes the data to a first register group that a plurality of processors does not access among a plurality of register groups. A control unit sequentially makes each of the plurality of processors implement a same instruction, in parallel with changing an address of a register group that stores the data to be processed. A scheduler, based on specified scenario information, specifies an instruction to be implemented and a register group to be accessed for the plurality of processors, and specifies a register group to be written to among the plurality of register groups and data to be processed that is to be written for the memory access unit.

10 Claims, 7 Drawing Sheets

(51) Int. Cl.
*G06N 20/00* (2019.01)
*G06F 12/0875* (2016.01)

(52) U.S. Cl.
CPC ........ *G06F 9/3887* (2013.01); *G06F 12/0875* (2013.01); *G06N 20/00* (2019.01); *G06F 2212/452* (2013.01)

(56) References Cited

U.S. PATENT DOCUMENTS

| | | | |
|---|---|---|---|
| 2013/0042090 A1* | 2/2013 | Krashinsky | G06F 9/3887 712/214 |
| 2013/0326160 A1* | 12/2013 | Sperber | G06F 9/345 711/154 |
| 2016/0283240 A1* | 9/2016 | Mishra | G06F 9/30018 |
| 2017/0116153 A1 | 4/2017 | Takada | |
| 2018/0232235 A1* | 8/2018 | Gaur | G06F 8/41 |
| 2019/0005377 A1* | 1/2019 | Malaya | G06N 3/0427 |

FOREIGN PATENT DOCUMENTS

| | | |
|---|---|---|
| JP | 2008-090455 A | 4/2008 |
| JP | 2011-141823 A | 7/2011 |
| WO | 2016/024508 A1 | 2/2016 |

OTHER PUBLICATIONS

Written Opinion issued in PCT/JP2019/017233; dated Aug. 6, 2019.
An Office Action; "Notification of Reasons for Refusal", mailed by the Japanese Patent Office dated Oct. 12, 2021, which corresponds to Japanese Patent Application No. 2020-515484 and is related to U.S. Appl. No. 17/049,197; with English language translation.

* cited by examiner (a)

(b)

| Unit number | f1 |
|---|---|
| Next list | f5, f6, f7 |
| Processing device No. | 1 |
| Image size | ... |
| Parameter address | ... |
| Buffer information | ... |
| Transfer amount | ... |
| ... | ... |

200

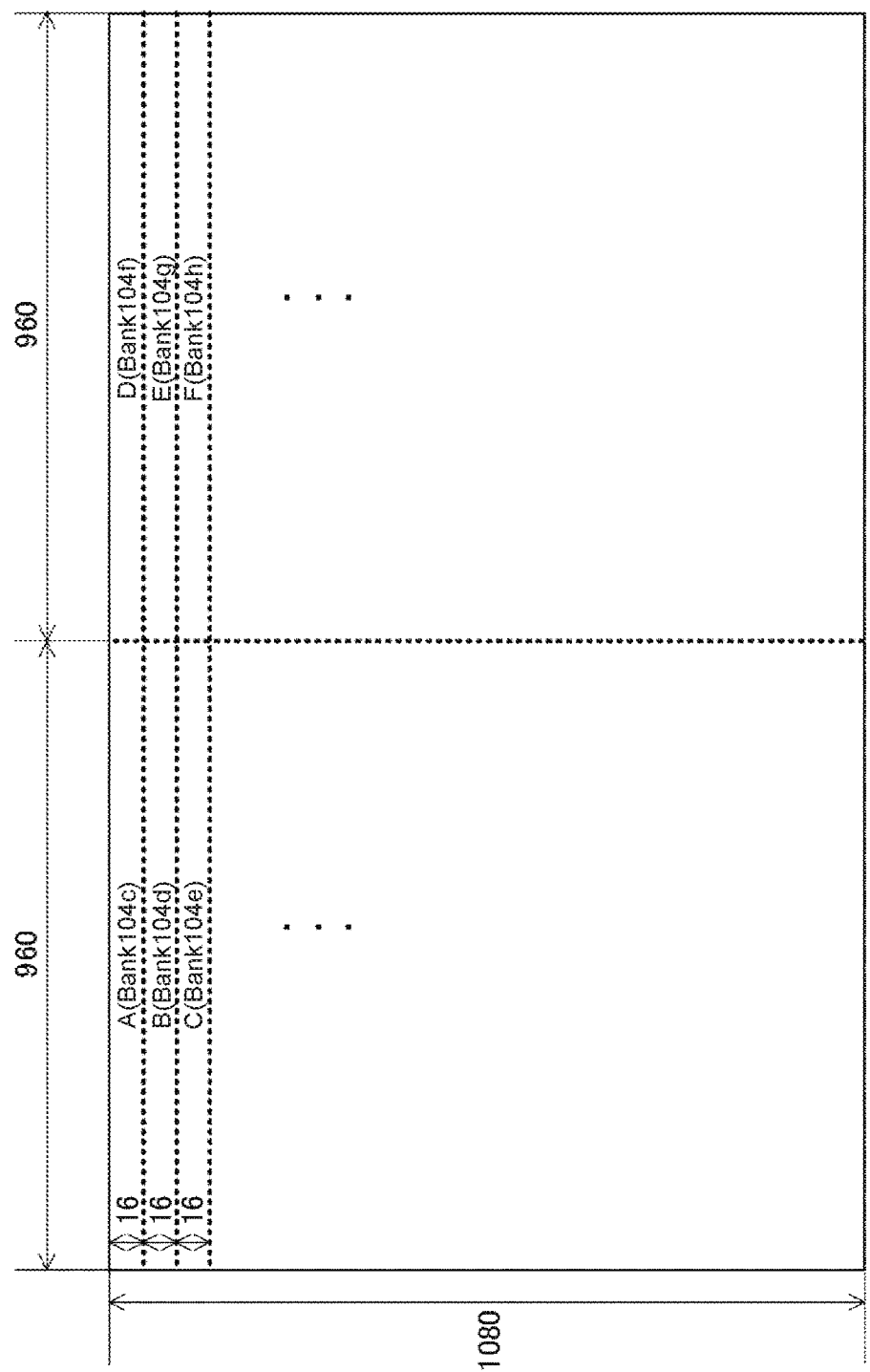

PROCESSOR DEVICE FOR EXECUTING SIMD INSTRUCTIONS

TECHNICAL FIELD

The present invention relates to a processor device.

BACKGROUND ART

In recent years, a processing device capable of performing a very large amount of processing, such as image processing, simply and at high speed is desired. As a means for performing such a large amount of processing at high speed, parallel processing is promising. However, the parallel processing requires a high degree of expertise in various fields, such as expertise in program construction, and transmission between processors due to data dependency. Thus, a patent document 1 proposes a technique wherein, in a multiprocessor device having a plurality of processors and a register memory, the plurality of processors repetitively processes the same instruction by performing processing of only a given quantity while changing addressing for the register memory, when the processing of the given quantity is finished, the command is switched to a next command, and processing of only a next given quantity is performed.

CITATION LIST

Patent Document

Patent document 1: WO 2016/024508

SUMMARY OF INVENTION

Problems to Be Solved by Invention

The processor device as disclosed in the above-described patent document 1 is desired to process at much higher-speed. As one of the large amount of processing as described above, inference processing and learning processing in deep learning is exemplified. Since actual state of the deep learning is a matrix product-sum operation, mounting many matrix operation units specialized in a product-sum operation on a processor device is assumed to improve processing performance thereof. However, in this situation, there is a problem that the processor device lacks universal applicability.

Thus, an object of the present invention is to provide a processor device capable of processing at higher-speed than conventional processor devices, as well as being applicable to various arithmetic processing.

Solution to Problem

To solve the above-described problem, a processor device according to one embodiment of the present invention includes an external memory, a plurality of processors, a plurality of register groups, a memory access unit, a control unit, and a scheduler. Each of the plurality of register groups includes a plurality of registers to store data to be processed. The memory access unit reads data to be processed from the external memory and writes the data to a first register group that the plurality of processors does not access among the plurality of register groups. The control unit sequentially makes each of the plurality of processors implement the same instruction, in parallel with changing an address of one register group that stores the data to be processed. The scheduler, based on specified scenario information, specifies an instruction to be implemented and a register group to be accessed for the plurality of processors, and specifies a register group to be written to among the plurality of register groups and data to be processed that is to be written for the memory access unit.

Alternatively, the above processor device can adopt a configuration wherein a bank that is comprised of one register group among the plurality of register groups and is defined for each of the plurality of processors is provided. In this configuration, each of the plurality of processors reads data from the register group that is defined as a bank and implements a given instruction.

In the above-described processor device, the plurality of processors may be configured to write data that is obtained as a result of implementing the instruction to the first register group from which data to be processed that is an original data thereof is read. In this case, the memory access unit may be configured to read the data that is written to the first register group by the plurality of processors, and write the data to the external memory.

Alternatively, in the above-described processor device, when the plurality of processors implements the same instruction by using the data stored in the first register group, the memory access unit may be configured to read data to be processed from the external memory according to an instruction to be implemented next by the plurality of processors and write the data to be processed to a second register group that is included in the plurality of register groups and includes a plurality of registers different from the first register group.

Further, in the above-described processor device, the scheduler may be configured to increase operation speed of each of the plurality of processors according to an instruction to be implemented by each of the plurality of processors.

Furthermore, the scheduler is inputted a leaning model comprised of a node and a link for inference processing and learning processing in deep learning. In this case, the scheduler may be configured to store input data to each node of the learning model in each register of the plurality of register groups, and the plurality of processors performs an arithmetic operation to be performed in each node.

Effect of Invention

The processor device according to one embodiment of the present invention can achieve parallel processing simply by implementing the same instruction by performing processing of only a specified quantity, in parallel with sliding the address of the register memory, and further can enhance a parallel degree of the processing by setting a bank where the plurality of processors is accessible.

BRIEF DESCRIPTION OF DRAWINGS

FIG. 7 is a diagram showing examples of division of an image and allocation to a bank in image processing by the processor device according to one embodiment of the present invention.

DESCRIPTION OF EMBODIMENTS

Detailed descriptions of the processor device according to one embodiment of the present invention is provided below with reference to the drawings.

A processor device 100 in the present invention includes an external memory, a plurality of processors, a plurality of register groups, a memory access unit, a control unit, and a scheduler. Each register group includes a plurality of registers to store data to be processed. The memory access unit reads data to be processed from the external memory and writes the data to a first register group that the plurality of processors does not access among the plurality of register groups. The control unit sequentially makes each of the plurality of processors implement the same instruction, in parallel with changing an address of one register group that stores the data to be processed. The scheduler, based on specified scenario information, specifies an instruction to be implemented and a register group to be accessed for the plurality of processors, and specifies a register group to be written to among the plurality of register groups and data to be processed that is to be written for the memory access unit.

Herein, an "external memory" refers to a large capacity storage media with a function of storing data to be processed.

Further, a "register memory" refers to a storage media having smaller capacity than the external memory with a function of temporarily storing data to be processed.

A "processor" refers to a hardware to implement an instruction in a computer system.

To "access" refers to reading data from a memory or writing data to the memory.

A "bank" is an area where a processor being set to a register memory is accessible. Setting a bank to a register memory allows respectively different processors to simultaneously access respectively different banks as long as the respective access does not collide with each other.

Also, to "define a bank for a processor" refers to specifying an address range where the processor is accessible in a register memory.

Figure 1:
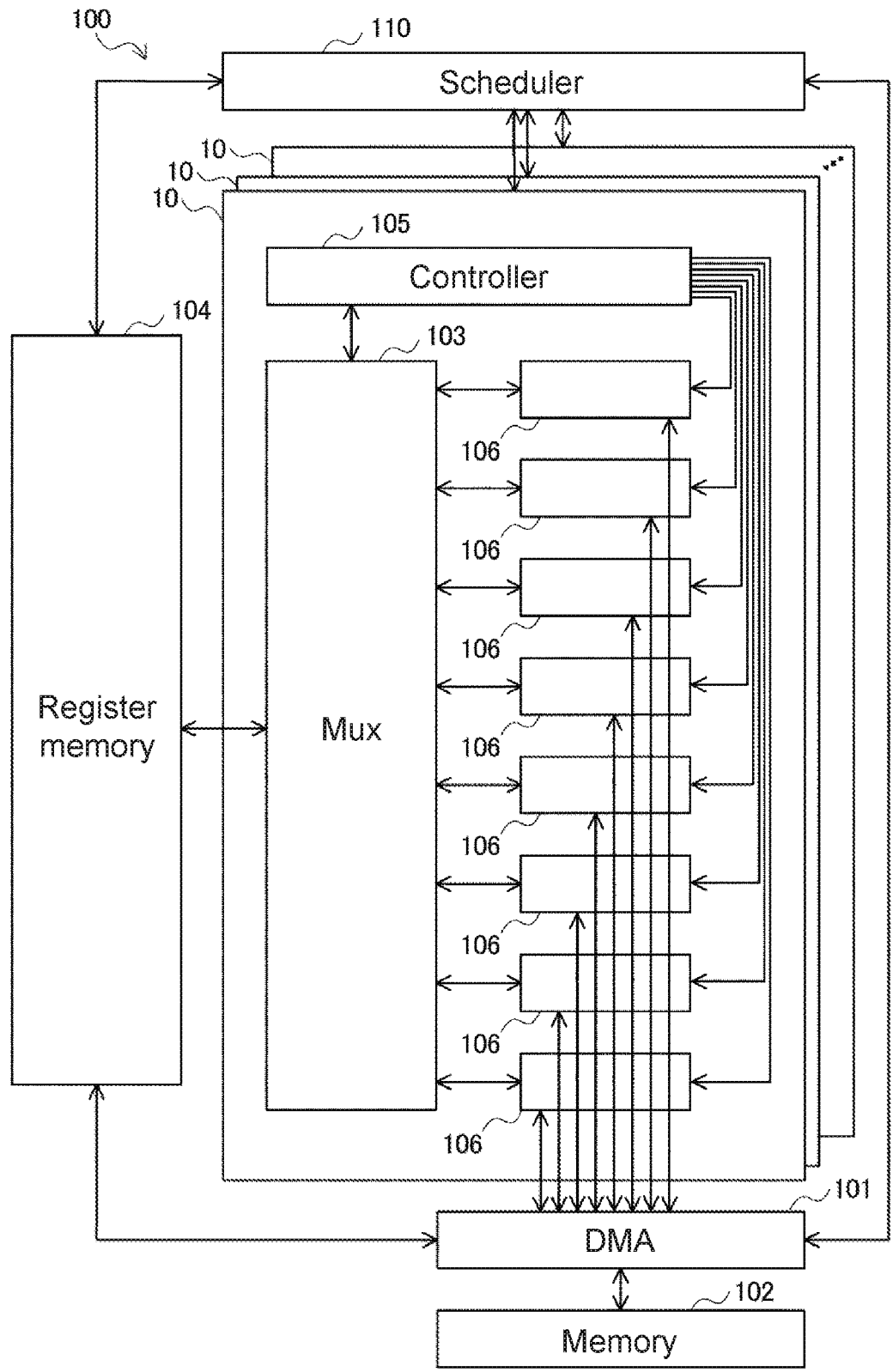
FIG. 1 is a block diagram showing an example of a configuration of a processor device according to one embodiment of the present invention.

FIG. 1 is a block diagram showing a configuration of a processor device 100 according to one embodiment of the present invention. As shown in FIG. 1, the processor device 100 includes a dynamic memory access controller (DMA) 101, a memory 102, a register memory 104, a scheduler 110, and a plurality of arithmetic units 10. Each arithmetic unit 10 includes a multiplexer 103, a controller 105, and a plurality of processors 106. The scheduler 110 is connected to the DMA 101, the register memory 104, and the controller 105 in each of the arithmetic units 10. The DMA 101 is connected to the scheduler 110, the memory 102, the register memory 104, and each of the processors 106 in each of the arithmetic units 10. The register memory 104 is connected to the DMA 101, the scheduler 110, and the multiplexer 103 in each of the arithmetic units 10.

The scheduler 110, according to scenario information and a program stored in the memory 102, reads data from the memory 102 and instructs the DMA 101 to write data required for processing to the register memory 104. The scheduler 110 identifies content of an arithmetic operation to be performed according to the scenario information and specifies one arithmetic unit 10 among the plurality of arithmetic units 10 to perform the processing according to the content of the arithmetic operation to be performed. The scheduler 110 instructs the specified arithmetic unit 10 about the content of the arithmetic operation to be performed and an area (an address range) of the register memory 104 to be accessed.

Although an example of specifying one arithmetic unit 10 as the arithmetic unit 10 to perform the processing according to the content of the arithmetic operation is described herein, the number of arithmetic unit 10 to perform the processing according to the content of the arithmetic operation is not limited to one but may be more than one.

The DMA 101 functions as a memory access device that reads the data from the memory 102 and stores the data in the register memory 104 according to the instruction from the scheduler 110. Also, the DMA 101 reads a result of the arithmetic operation performed by the processor 106 that is stored in the register memory 104, and writes the result of the arithmetic operation to the memory 102.

The memory 102 is a large capacity storage unit that has a function of storing data that is to be processed by the processor device 100, and the scenario information specifying content of processing and a program. The large capacity storage herein means that the capacity of the memory 102 is larger than that of the register memory 104. For example, the memory 102 can be achieved by a synchronous dynamic random access memory (SDRAM). The memory 102 corresponds to the external memory.

The multiplexer 103 accesses the register memory 104 according to an instruction provided to a register access of the processor 106.

The register memory 104 is comprised of a plurality of registers. The register memory 104 is a memory to temporarily store data of the processors 106 to be processed. The memory 104 can be achieved by a static random access memory (SRAM). The number of registers prepared corresponds to the number of logical processors. For example, assuming that one processor has 16 registers, the number of physical processors is eight, and the number of logical processors is 1024, the number of registers may be configured to be 16×1024=16384. Thus, the number of logically maintained registers corresponds to 1024 processors and the logically processable number per unit time (one cycle) is up to eight.

The controller 105 in the arithmetic unit 10, according to the processing (the arithmetic operation to be performed by the arithmetic unit 10) and an address of the register memory 104 specified by the scheduler 110, specifies the arithmetic operation to be processed (the instruction to be implemented by the processors) and an address of the register memory 104 where the data to be processed is stored for each of the processors in the arithmetic unit 10. In other words, the controller 105 in the arithmetic unit 10 functions as a control unit to make each processor 106 sequentially implement the instruction, in parallel with changing the address of the register memory 104 to be accessed. The controller 105 make each of the processors 106 in the arithmetic unit 10 sequentially implement the same instruction (the arithmetic operation to be performed by the arithmetic unit 10), in parallel with changing the address of the register memory 104 to be processed. The controller 105 controls each of the processors 106 in the arithmetic unit 10 and specifies a next instruction when receiving a completion signal of the specified processing from the processor 106.

In the embodiment, eight processors 106 are physically provided in the arithmetic unit 10. The logical number of the processing of SIMD which the processor 106 herein can perform is assumed to be 1024. The processor 106 in the arithmetic unit 10, according to the instruction from the controller 105 in the arithmetic unit 10, reads the data stored in the specified address for reading of the register memory 104 via the multiplexer 103 to process the data and stores a result of the arithmetic operation in the specified address for writing of the register memory 104 via the multiplexer 103. Each of the processors 106 in the arithmetic unit 10 implements the same instruction (the arithmetic operation to be performed by the arithmetic unit 10), in parallel with changing the data to be processed, or, in other words, in parallel with changing the address of the register memory 104 from which the data is read.

Figure 2:
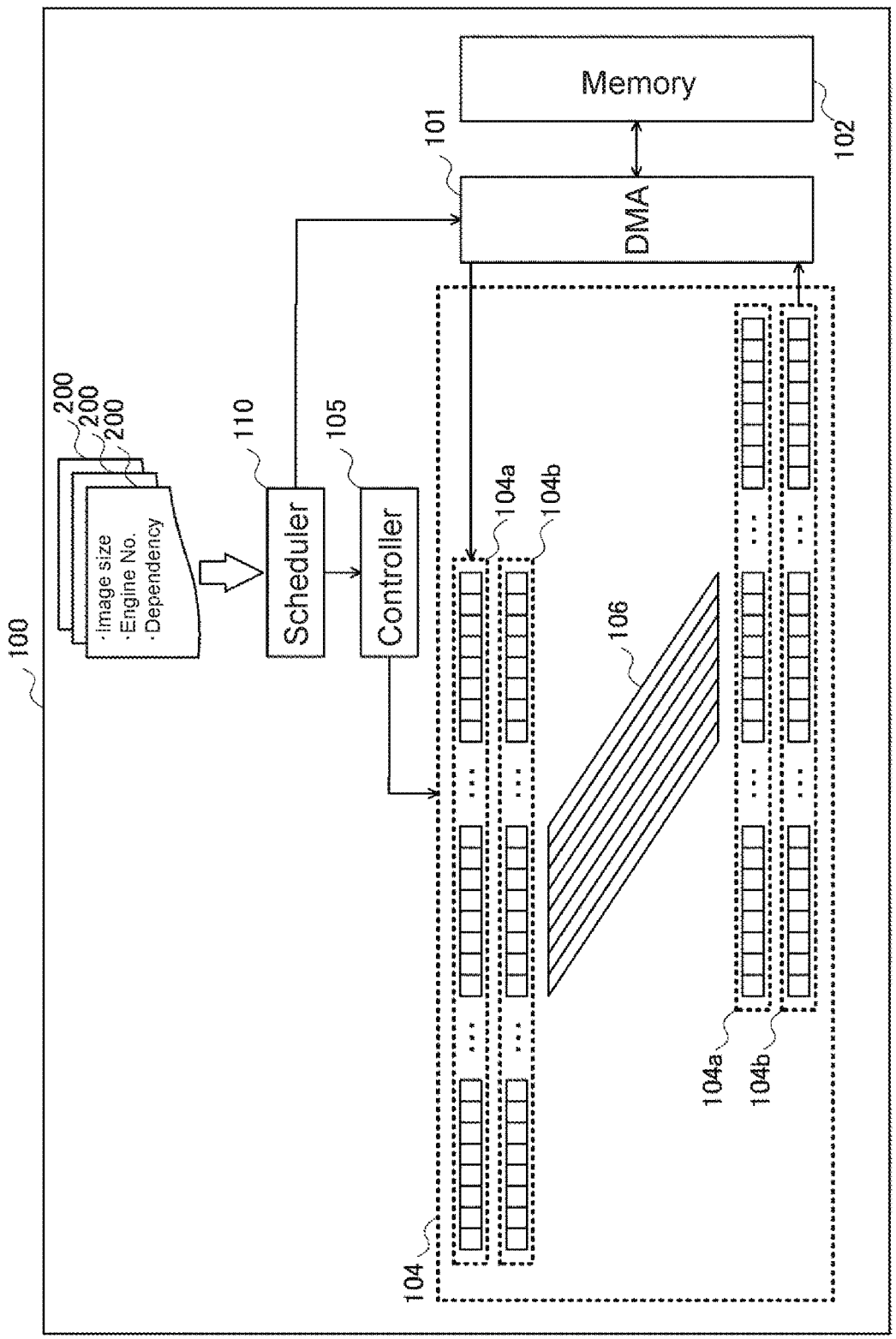
FIG. 2 is a diagram showing a processing image of the processor device according to one embodiment of the present invention.

FIG. 2 is an image diagram showing a basic processing configuration of the processor device 100 according to the present invention.

The processor device 100 according to the embodiment performs following processing according to inputted scenario information 200 (the scenario information 200 stored in the memory 102).

(1) The scheduler 110 accepts input of the scenario information 200 and identifies an arithmetic unit 10 that is specified by the scenario information 200 among a plurality of the arithmetic units 10. Also, the scheduler 110 transmits content of processing to be performed and an address of the register memory 104 to be accessed by the arithmetic unit 10 to the identified arithmetic unit 10. Further, the scheduler 110 specifies data that the DMA 101 reads from the memory 102 and writes to the register memory 104.

(2) The DMA 101 reads the data to be processed from the memory 102 and stores the data in a second register group 104b. The second register group 104b herein is a storage area that is configured of a plurality of registers belonging to the register memory 104.

(3) Each processor 106 in the arithmetic unit 10 implements the same instruction as specified by the controller 105 (the arithmetic operation to be performed by the arithmetic unit 10) for the data stored in the second register group 104b, in parallel with changing a address for reading of the second register group 104b. In FIG. 2, the plurality of processors 106 is obliquely illustrated to show passage of time. In other words, FIG. 2 shows a state where the plurality of processors 106 applies some kind of arithmetic operation to the data read from the register memory 104 and applies another arithmetic operation to the operated value.

(4) While each processor 106 in the arithmetic unit 10 performs the same instruction (the arithmetic operation to be performed by the arithmetic unit 10) by using the data stored in the second register group 104b, the DMA 101 reads the data to be processed next from the memory 102 and stores the data in a first register group 104a. In the register memory 104, the first register group 104a herein is a storage area that is configured of a plurality of registers that does not belong to the second register group 104b.

(5) Each processor 106 in the arithmetic unit 10 stores a processing result (a result of the arithmetic operation to be performed by the arithmetic unit 10) in the second register group 104b. A storing destination is prespecified, but when the storing destination is an area that the DMA 101 does not access, the storing destination may be any register group other than the second register group 104b.

(6) the DMA 101 reads the data stored in the second register group 104b and stores the data in the memory 102.

(7) Meanwhile, while the DMA 101 reads the arithmetic result stored in the second register group 104b and stores the arithmetic result in the memory 102, each processor 106 in the arithmetic unit 10 implements the same instruction as specified by the controller 105 (the arithmetic operation to be performed by the arithmetic unit 10) in parallel with changing a address for reading of the first register group 104a. As described above, in FIG. 2, the plurality of processors 106 is obliquely illustrated to show the passage of time.

The above-described processing (1) to (7) is repeatedly performed, thereby it is unnecessary for the arithmetic unit 10 to wait for the data to be processed being stored in the register memory 104. Therefore, a state where each of the arithmetic units 10 constantly runs to perform the processing can be generated, thereby achieving high-speed processing.

In this manner, each of the arithmetic unit 10 accesses the first register group 104a and the second register group 104b respectively to read the data at a timing specified by the scheduler 110, and implements the same instruction (the processing that the arithmetic unit 10 is instructed). Meanwhile, the DMA 101 reads the processing result from the register group for which the arithmetic unit 10 does not perform the processing and writes the processing result to the memory 102 or the data to be processed next. Thereby, in the processor device 100, the processing can be faster than being in a state where all data to be processed is stored in the register memory 104. In addition, since it is unnecessary to use an expensive high-speed accessible register memory for the register memory 104 according to the embodiment, less expensive processor device 100 can be provided.

In FIG. 2, in order to show the processing within the arithmetic unit 10, illustration of the multiplexer 103 is omitted to make the processing easily understandable.

Figure 3:
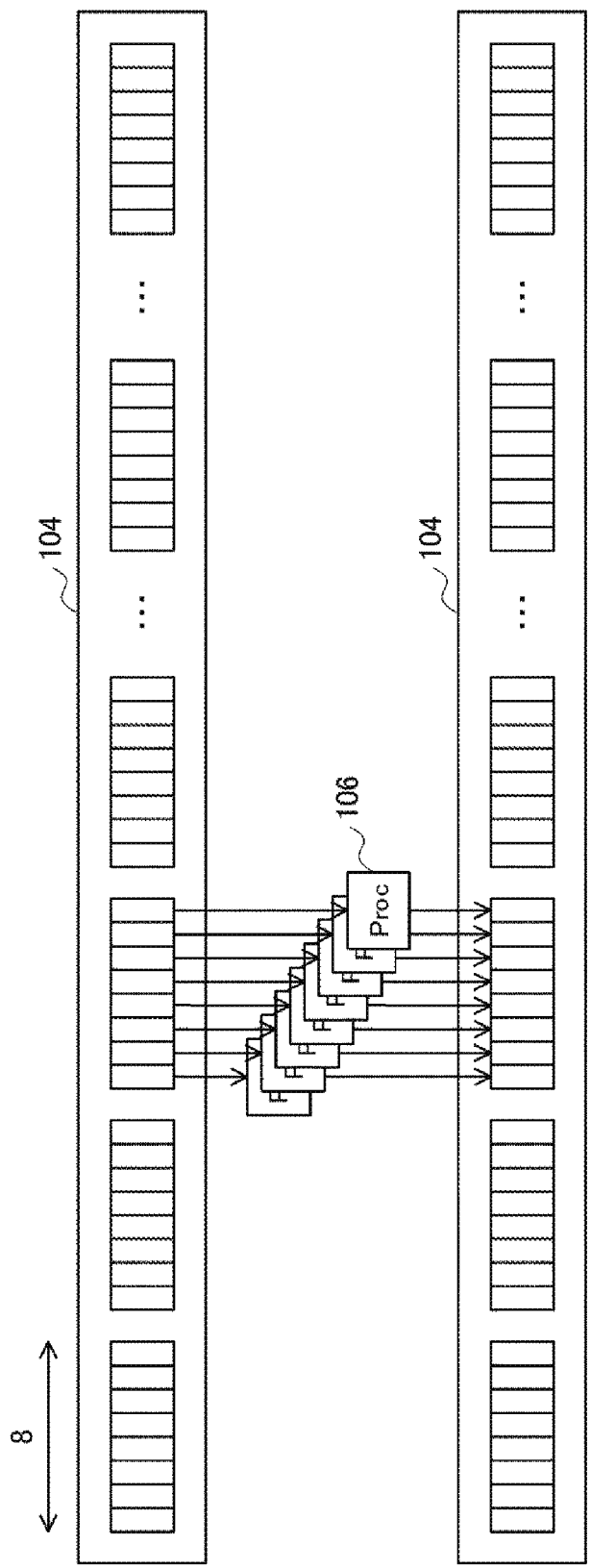
FIG. 3 is a diagram showing a processing image of processors according to one embodiment of the present invention.

FIG. 3 shows a processing image of each processor 106. As shown in FIG. 3, for example, when one arithmetic unit 10 in the processor device 100 has eight processors 106, each processor 106 in the arithmetic unit 10 implements an instruction in parallel with sliding (shifting) the predetermined number (e.g., eight units) of addresses of register memory that each processor 106 accesses. In other words, each processor 106 in the arithmetic unit 10 implements the same instruction (an arithmetic operation to be performed by the arithmetic unit 10) by only a predetermined processing quantity N (the number of logical processors) in parallel with changing reference data. Thus, in the processor device 100, as long as a value obtained by dividing the processing quantity N by the number of processors is larger than the number of pipeline stages, hazard, i.e. a situation where reading and writing the data from and to the register memory 104 is redundant, does not occur. In other words, the larger the processing quantity N is, the larger the number of pipeline stages can be in the processor device 100. Thus, the processor device 100 performs a simple arithmetic operation in each pipeline, and accumulating these operations makes an advanced arithmetic operation possible. By adopting such configuration, it is unnecessary for the processor device 100 to perform complicated memory access control.

Figure 4:
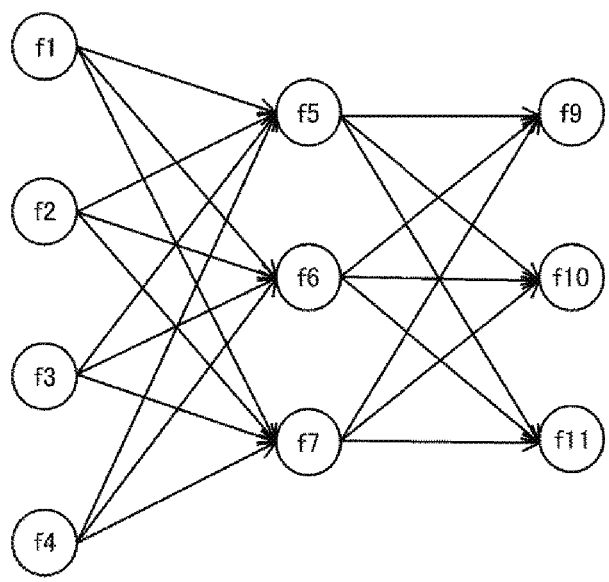
FIG. 4 (*a*) is a diagram showing an example of learning model in deep learning, and FIG. 4 (*b*) is a schematic diagram of data showing an example of configuration of scenario information provided to a controller according to one embodiment of the present invention.

The processor device 100 can be utilized for inference processing and learning processing in deep learning. As described above, most part of the inference processing and the learning processing in the deep learning comprises product-sum operations. FIG. 4 (a) shows an example of a learning model with respect to the inference processing and the learning processing in the deep learning. The learning model is commonly known to be represented by a node and a link between nodes. Although FIG. 4 (a) shows a simplified example, the learning model includes an input layer, a convolution layer, a pooling layer, an output layer, and the like. In the node, a processing operation (such as multiplication and addition) is defined and the link represents a dependency relation. For example, with respect to such inference processing, where the inference processing to estimate what an input image represents is performed, a pixel value on one line of an image is stored in the register memory 104 and each processor 106 performs the same processing (respective processing of f1, f2, ... represented by the nodes) for the pixel value. When the processing of such one line is completed, each of the processors 106 respectively performs the processing for a next line, and, in such a manner, the inference processing of the pixel values of the image of one sheet is made possible. The DMA 101 stores the data of the next line in a register group other than the register group that stores the data of a line that is processed by the plurality of processors 106 so that the processing is performed without interruption and logical contradiction.

FIG. 4 (b) is a schematic diagram of data showing in detail an example of the scenario information 200 provided to the processor device 100. The scenario information 200 corresponding to an amount of tasks to be processed is stored in the memory 102. The scenario information 200 may be configured to be preset by program and stored, or, as shown in FIG. 4 (a), may be configured to be defined by subdivision of the learning model, which is inputted to the scheduler 110, by the scheduler 110.

The scenario information 200 as shown in FIG. 4 (b) is a meta description of an AI structure (the learning model) that is a subdivision of the processing in one node of the learning model as shown in FIG. 4 (a). In FIG. 4 (b), a unit number refers to an identifier for making each node in FIG. 4 (a) identifiable. A next list refers to information that indicates processing to be performed next (the unit number) after the processing indicated in the scenario information 200 shown in FIG. 4 (b) is performed, and the information that indicates dependency relation with other scenario information 200. A processing device number refers to processing content to be performed according to the scenario information 200 and information that indicates which process (such as, addition, multiplication) is performed. For example, when a processing device number 1 is an adder, addition is performed according to the scenario information 200. The processing device number as described herein is information to specify either one of the arithmetic units 10 (one or the plurality of the arithmetic units 10). An image size refers to information that defines a size of data to be processed. Although the image size is described herein, that is because image processing is assumed, and when the processing other than the image processing is performed, a processing size is described. A parameter address refers to information that specifies an address of the register memory 104 that stores data to be processed. Buffer information refers to information that specifies which unit (e.g., a frame unit or line unit when an object is an image) to be processed. Transfer amount refers to information indicating which dimensional processing is performed, for example, two-dimensional processing is performed for the image processing.

By referring to the scenario information 200 as shown in FIG. 4 (b), the scheduler 110 makes the DMA 101 read data to be processed from the memory 102 and makes the DMA 101 store the data in a register of the register memory 104 that has the address indicated by the parameter address. After confirming completion of all of the processing having the unit number indicated by the scenario information 200 to be processed as a next list in other scenario information 200, the scheduler 110 specifies processing indicated by the processing device number for the arithmetic unit 10 and instructs start of the processing. Thus, the plurality of processors 106 in the arithmetic unit 10 implements the specified same instruction (the arithmetic operation to be performed by the arithmetic unit 10) by only the specified processing quantity, in parallel with changing the address of the register memory 104.

Further, the processor device 100 as described above may be configured to set a bank for the register memory 104. The bank refers to a unit of area where each processor 106 is accessible. The bank may be referred to as an area where an access request is generated. In other words, in the above-described processor device 100, the bank is a storing area for data to be processed according to the same instruction (the arithmetic operation to be implemented by the processor device 10) that is implemented by each processor 106 in the arithmetic unit 10. In this embodiment, as with the first register group 104a and the second register group 104b, the bank is a register group configured with a plurality of registers that belongs to the register memory 104. The bank is defined for each of the plurality of processors 106, and each of the plurality of processors 106 reads the data from the register group defined as the bank for each of the processors and implements the instruction. The register that belongs to the bank to be defined for one processor 106 may not belong to other bank to be defined for other processor 106.

The bank may be configured to be set beforehand for a specific area range (a register group), or the controller 105 in the arithmetic unit 10 is configured to set the area range for the register memory 104 according to processing content. Where the controller 105 in the arithmetic unit 10 sets the area range, based on buffer information of the scenario information 200, the controller 105 determines an area to store the data to be processed according to the scenario information 200 among the areas in the register memory 104 that the processors 106 does not access.

Figure 5:
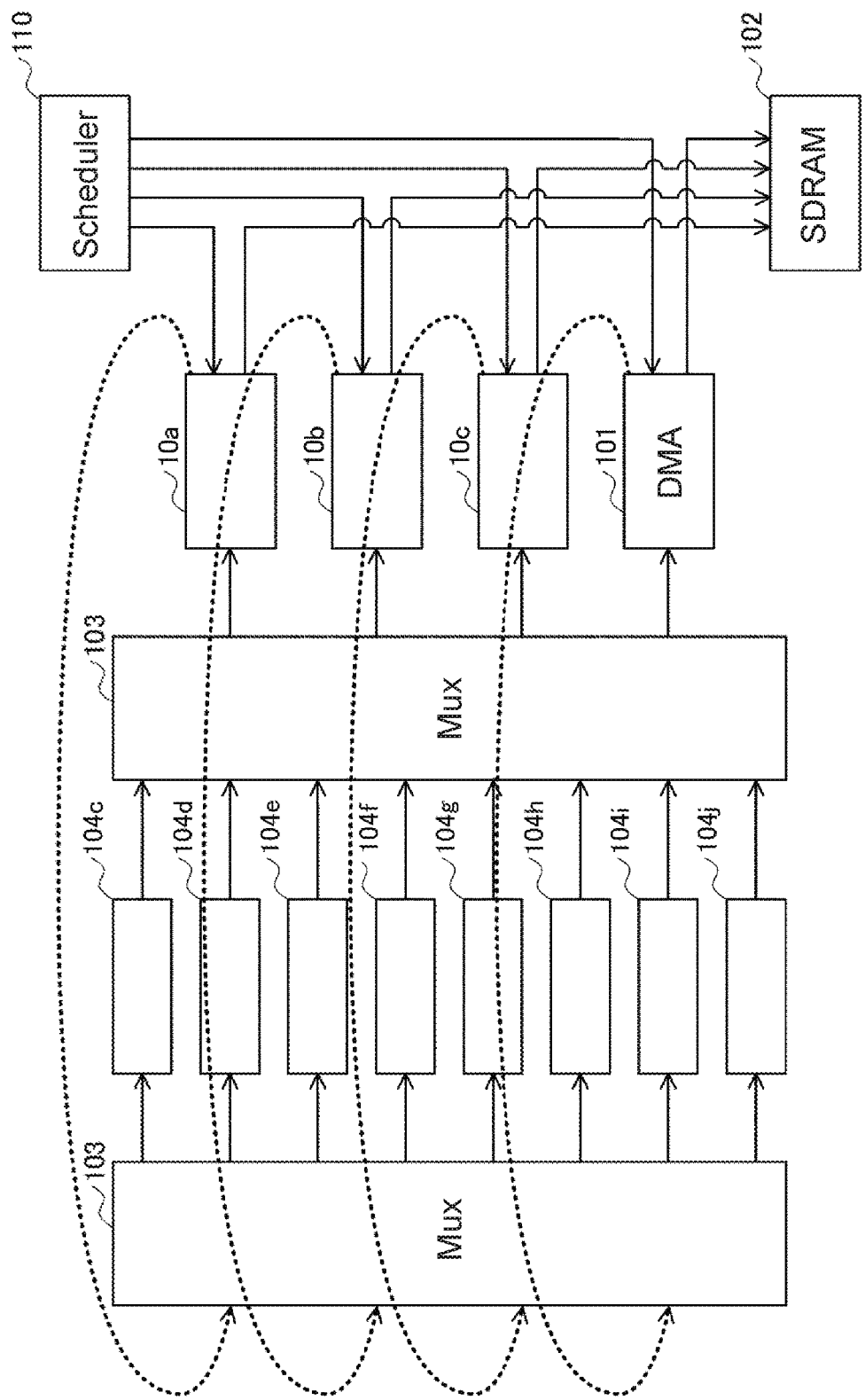
FIG. 5 is a block diagram showing an example of another configuration of the processor device according to one embodiment of the present invention.

FIG. 5 is a diagram showing a configuration example wherein banks 104c to 104j are set for the register memory 104 and three arithmetic units 10a to 10c are provided. According to an instruction of the scheduler 110, the DMA 101 determines which bank within the register memory 104 the data is to be stored depending on the scenario information and/or the program stored in the memory (SDRAM) 102. Similarly, according to the instruction of the scheduler 110, each of the arithmetic units 10a to 10c reads the data from a bank among the banks 104c to 104j that stores the data to be processed via the multiplexer 103. Each of the arithmetic units 10a to 10c implements the same instruction specified for each of the arithmetic units 10a to 10c (an arithmetic operation to be performed by each of the arithmetic units 10a to 10c) in parallel with changing an address in the bank (the address of the register memory 104), and writes an arithmetic result to the same bank or other specified bank.

Figure 6:
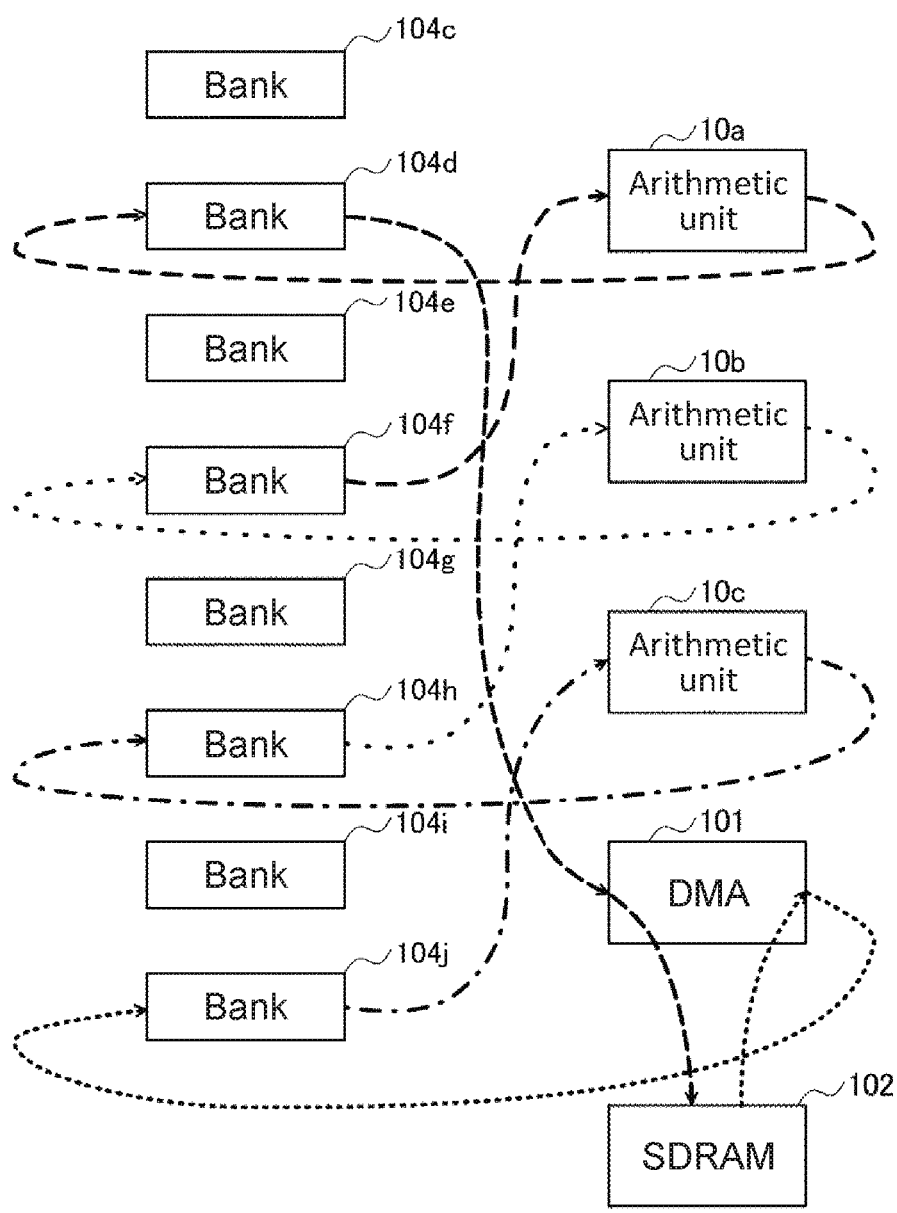
FIG. 6 is a diagram showing a processing image of the processor device according to the configuration of the processor device in FIG. 5.

In this manner, by setting the bank for the register memory 104, for example, processing as shown in FIG. 6 can be achieved.

The DMA 101 reads data to be processed from the memory 102 and writes the data to the bank 104j. The arithmetic unit 10c implements the same instruction (the arithmetic operation to be performed by the arithmetic unit 10c) for the data written to the bank 104j in parallel with changing an address in the bank 104j, and writes an arithmetic result to the bank 104h. Thereafter, the arithmetic unit 10b implements the same instruction (the arithmetic operation to be performed by the arithmetic unit 10b) for the arithmetic result written to the bank 104h in parallel with changing an address in the bank 104h, and stores the result to the bank 104f. Thereafter, the arithmetic unit 10a implements the same instruction (the arithmetic operation to be performed by the arithmetic unit 10a) for the arithmetic result written to the bank 104f in parallel with changing an address in the bank 104f, and stores the result to the bank 104d. The DMA 101 writes the final arithmetic result stored in the bank 104d to the memory 102.

In this manner, when the data to be processed is stored in the bank to be accessed, the DMA 101 and each of the arithmetic units 10a to 10c can perform the parallel processing. When a processing quantity specified by the instruction in response to each of the arithmetic units 10a to 10c is finished, each of the arithmetic units 10a to 10c transmits an end flag indicating completion of the processing to the scheduler 110. Thus, the scheduler 110 can provide a next instruction to the arithmetic units 10a to 10c that finish the processing, and/or can instruct start of next processing when dependency relation is present between the processing. Alternatively, when the banks are set for the arithmetic units 10a to 10c as described above, the scheduler 110 may make the arithmetic units 10a to 10c refer to the banks that are allocated to other processors if required for the processing in order to enhance degree of freedom of the processing. For example, where a register group that stores pixels on one line of an image is set as a bank, the controller 105 in each of the arithmetic units 10 may be configured to specify an address so as to refer to the bank being set for other arithmetic unit 10 as an offset, when required to refer to pixels on other line depending on the processing content. Adopting such configuration allows universal applicability and degree of freedom of image processing to be greatly enhanced.

Further, in addition to the above-described setting of the register group, register groups corresponding to the first register group and the second register group in FIG. 2 may be set in order to allow the DMA 101 to access between the register memory 104 and the memory 102 as described above in FIG. 2.

The processing in the processor device 100 as shown in FIG. 5 and FIG. 6 is useful, for example, in image processing. For example, image processing of 1920×1080 pixel as shown in FIG. 7 is examined. For example, where a range of pixel of 960×16 is allocated as a unit system to a processing device 10, as shown in FIG. 7, when an area A is from (0, 0) to (959, 15), each pixel data in the area A is stored in the bank 104c as one bank. Similarly, when an area B is from (0, 15) to (959, 30), each pixel data in the area B is stored in the bank 104d as one bank. In this manner, as shown in FIG. 7, an image is divided by a plurality of areas and each area is allocated to one bank to process. Each pixel value of lateral 960 pixels is stored in 960 registers, and when the number of physical processors is eight, the processors slide only eight addresses after processing eight pixels and process the next eight pixels. Since exactly the same processing is frequently applied in the image processing, the processor device 100 is particularly effective for such repetitive processing.

The area A as shown in FIG. 7 is data to be allocated to one bank before processing, thereby the processing can be performed without uselessness. Specifically, as one bank, processing X is applied for 960 pixels of data to store such processed data in other bank and processing Y is applied for the stored data, and, in parallel, the processing X for new 960 pixels of data is made possible.

At this time, as shown in FIG. 7, due to an area of the register memory where can be set as a bank, it may be considered that original data is processed in the plurality of areas by dividing the original data. In this case, the data in each adjacent bank (pixels of other adjacent areas) may be referred to. Thus, in such a case, since a configuration of referring to other banks makes the processing being complicated, end parts of areas set as the banks may be set so as to overlap each other. For example, as shown in FIG. 7, where an area of 960×16 is set as one bank, when pixel data in an area from (0, 0) to (959, 15) is stored in the bank, pixel data in an area from (0, 15) to (959, 30) may be stored in a next bank. Thereby, it is unnecessary to refer to other bank (pixels of other adjacent area) so that processing is not complicated. Overlapping the banks in the areas in a vertical direction is exemplified herein, as well as banks in areas in a horizontal direction may be overlapped. The processor device 100 is particularly effective for repeating the same processing for a plurality of objects such as the image processing (pixels in the image processing).

The simpler each one of arithmetic operations in a pipeline processing performed by each processor is, the higher speed of the processing over the processor device 100 is made possible by making operation frequency of the processors higher. To achieve the higher speed processing, the operation frequency of the processors 106 is configured to be variable, and the scheduler 110 or the controller 105 may be configured to determine whether to vary the operation frequency of processors 106. The scheduler 110 or the controller 105 may be configured to vary the operation frequency based on the scenario information 200 depending on processing to be performed that is allocated to the processors 106. For example, the scheduler 110 or the controller 105, depending on a type of processing, may be configured to keep a table that determines the operation frequency of the processors 106 and vary the operation frequency corresponding to the processing allocated to the processors.

When processing to be performed in each of the arithmetic units 10 (an instruction to be implemented by the processors) is predetermined, simplifying a unit of arithmetic operation to be implemented in the processing enables the processing speed to be increased (setting the operation frequency of the processors high beforehand), even though a pipeline in the arithmetic operation becomes longer. As a result, for example, even when the result of the arithmetic operation is obtained after 100 cycles over the whole processing, the processing speed of each of the processing can be increased, as well as processing time of the whole processing can be shortened.

In the processor device 100, any number of processors and register memories may be provided in the processor device 100, but it is desirable for the register memory as a whole to have the sufficient number of registers to perform processing of a required quantity.

DESCRIPTION OF REFERENCE SIGNS 100 processor device
101 DMA (memory access unit)

102 memory (external memory)
103 multiplexer
104 register memory
105 controller (control unit)
106 processor
110 scheduler

The invention claimed is:

1. A processor device, comprising:
an external memory;
a plurality of processors;
a plurality of register groups, each of the plurality of register groups including a plurality of registers to store data to be processed;
a memory access unit configured to, based on an inputted instruction, read data to be processed from the external memory and write the data to a register group among the plurality of register groups;
a control unit configured to sequentially make each of the plurality of processors implement a same instruction in parallel with changing an address of one register group that stores the data to be processed; and
a scheduler configured to, based on specified scenario information, generate a first instruction and a second instruction associated with the first instruction, the first instruction instructing an instruction to be implemented by the plurality of processors and a read register group to be accessed for the plurality of processors, the second instruction instructing the register group to be written to among the plurality of register groups and data to be processed that is to be written for the memory access unit, wherein
the memory access unit configured to, based on the second instruction from the scheduler, write the data to be processed corresponding to the instruction to be implemented after the instruction currently being implemented by the plurality of processors to a first register group that the plurality of processors does not access when the plurality of processors implements the same instruction, and
the control unit configured to, based on the first instruction from the scheduler, make each of the plurality of processors access the first register group when the plurality of processors implement the instruction corresponding to the first register group.

2. The processor device according to claim 1, wherein a bank that is defined for each of the plurality of processors is further provided, and each of the plurality of processors is configured to read data from the read register group that is defined as the bank and implement a given instruction.

3. The processor device according to claim 1, wherein the plurality of processors is configured to write data that is obtained as a result of implementing the instruction to the first register group from which the data to be processed that is an original data of the data is read, and the memory access unit is configured to read the data to be written to the first register group by the plurality of processors and write the data to the external memory.

4. The processor device according to claim 1, wherein, when the plurality of processors implements the same instruction by using the data stored in the first register group, the memory access unit is configured to read the data to be processed from the external memory according to an instruction to be implemented next by the plurality of processors and write the data to be processed to a second register group, the second register group being included in the plurality of register groups and including a plurality of registers different from the first register group.

5. The processor device according to claim 1, wherein the scheduler is configured to increase operation speed of the plurality of processors according to an instruction to be implemented by the plurality of processors.

6. The processor device according to claim 1, wherein the scheduler is configured to be inputted a leaning model for inference processing and learning processing in deep learning, the learning model comprised of a node and a link, and store input data to each node of the learning model in each register of the plurality of register groups, and the plurality of processors is configured to perform an arithmetic operation to be performed in each node.

7. The processor device according to claim 2, wherein the plurality of processors is configured to write data that is obtained as a result of implementing the instruction to the first register group from which the data to be processed that is an original data of the data is read, and the memory access unit is configured to read the data to be written to the first register group by the plurality of processors and write the data to the external memory.

8. The processor device according to claim 2, wherein, when the plurality of processors implements the same instruction by using the data stored in the first register group, the memory access unit is configured to read the data to be processed from the external memory according to an instruction to be implemented next by the plurality of processors and write the data to be processed to a second register group, the second register group being included in the plurality of register groups and including a plurality of registers different from the first register group.

9. The processor device according to claim 3, wherein, when the plurality of processors implements the same instruction by using the data stored in the first register group, the memory access unit is configured to read the data to be processed from the external memory according to an instruction to be implemented next by the plurality of processors and write the data to be processed to a second register group, the second register group being included in the plurality of register groups and including a plurality of registers different from the first register group.

10. The processor device according to claim 7, wherein, when the plurality of processors implements the same instruction by using the data stored in the first register group, the memory access unit is configured to read the data to be processed from the external memory according to an instruction to be implemented next by the plurality of processors and write the data to be processed to a second register group, the second register group being included in the plurality of register groups and including a plurality of registers different from the first register group.

* * * * *